US009981879B2

(12) United States Patent
Hao

(10) Patent No.: US 9,981,879 B2
(45) Date of Patent: May 29, 2018

(54) GEL METHOD FOR PREPARATION OF CERAMIC MATERIAL

(71) Applicant: SACHEM, INC., Austin, TX (US)

(72) Inventor: Jianjun Hao, Austin, TX (US)

(73) Assignee: SACHEM, Inc., Austin, TX (US)

( * ) Notice: Subject to any disclaimer, the term of this patent is extended or adjusted under 35 U.S.C. 154(b) by 430 days.

(21) Appl. No.: 14/765,909

(22) PCT Filed: Feb. 14, 2013

(86) PCT No.: PCT/US2013/026093
§ 371 (c)(1),
(2) Date: Aug. 5, 2015

(87) PCT Pub. No.: WO2014/126566
PCT Pub. Date: Aug. 21, 2014

(65) Prior Publication Data
US 2015/0368163 A1 Dec. 24, 2015

(51) Int. Cl.
| | |
|---|---|
| *C04B 35/00* | (2006.01) |
| *C04B 35/624* | (2006.01) |
| *C01G 51/00* | (2006.01) |
| *C01G 53/00* | (2006.01) |
| *C04B 35/01* | (2006.01) |
| *H01M 4/525* | (2010.01) |
| *C01G 45/12* | (2006.01) |
| *C01B 35/12* | (2006.01) |
| *C04B 35/64* | (2006.01) |

(52) U.S. Cl.
CPC .......... *C04B 35/624* (2013.01); *C01B 35/128* (2013.01); *C01G 45/1242* (2013.01); *C01G 51/42* (2013.01); *C01G 53/42* (2013.01); *C01G 53/44* (2013.01); *C04B 35/01* (2013.01); *C04B 35/64* (2013.01); *H01M 4/525* (2013.01); *C01P 2002/50* (2013.01); *C01P 2002/54* (2013.01); *C01P 2002/72* (2013.01); *C01P 2004/03* (2013.01); *C04B 2235/3203* (2013.01); *C04B 2235/3217* (2013.01); *C04B 2235/3262* (2013.01); *C04B 2235/3275* (2013.01); *C04B 2235/3279* (2013.01); *C04B 2235/3293* (2013.01); *C04B 2235/3409* (2013.01)

(58) Field of Classification Search
CPC .................................................... C01B 35/128
See application file for complete search history.

(56) References Cited

U.S. PATENT DOCUMENTS

| | | | | |
|---|---|---|---|---|
| 5,334,368 | A | * | 8/1994 | Beck .................. B01D 53/8628 423/328.2 |
| 5,958,624 | A | | 9/1999 | Frech et al. |
| 6,071,489 | A | | 6/2000 | Sun et al. |
| 2007/0148065 | A1 | | 6/2007 | Weir et al. |
| 2012/0261311 | A1 | | 10/2012 | Bellussi et al. |
| 2016/0101410 | A1 | | 4/2016 | Bellussi et al. |

FOREIGN PATENT DOCUMENTS

| | | | |
|---|---|---|---|
| CN | 102013475 | | 4/2011 |
| WO | 99/31745 | * | 6/1999 |
| WO | 2006036610 | | 4/2006 |

OTHER PUBLICATIONS

Official Action for Chinese Patent Application No. 2013800730192 dated Apr. 13, 2016 and its English translation.
Official Action for Korean Patent Application No. 10-2015-7023866 dated Aug. 22, 2016 and its English translation.
Boyle Timothy J et al.; "Rechargeable Lithium Battery Cathodes. Nonaqueous Synthesis, Characterization, and Electrochemical Properties of LiCoO2", Chemistry of Materials, American Chemical Society, vol. 10, No. 8, Aug. 17, 1998, pp. 2270-2276.
PCT/US2013/026093; PCT International Search Report and Written Opinion of the International Searching Authority dated Sep. 19, 2013.
PCT/US2013/026093; International Preliminary Report on Patentability dated May 8, 2015.

* cited by examiner

*Primary Examiner* — Steven J Bos
(74) *Attorney, Agent, or Firm* — Renner, Otto, Boisselle & Sklar, LLP

(57) ABSTRACT

A process for producing a ceramic material including providing an aqueous solution comprising at least one transition metal ion and one or more further transition metal ion and/or one or more additional ion; adding to the aqueous solution a quaternary ammonium or phosphonium hydroxide comprising at least one alkyl group containing about 8 or more carbon atoms to form a combined aqueous solution; mixing the combined aqueous solution to form a gel; transferring the formed gel to a furnace; and heating the formed gel to a temperature sufficient for a time sufficient to calcine the gel to form a solid ceramic material. The process in accordance with the present invention provides an improved ceramic material, in some embodiments of which is suitable for use in the cathode material of a lithium ion battery.

17 Claims, 19 Drawing Sheets

NO$_3^-$, nitrate anion in transition metal salt

N$^+$∿∿∿, quaternary ammonium cation bearing long aliphatic chains

NO₃⁻, nitrate anion in transition metal salt

N⁺∿∿∿, quaternary ammonium cation bearing long aliphatic chains

NO₃⁻, nitrate anion in transition metal salt; X⁻, all other anions
N⁺∿∿∿, quaternary ammonium cation bearing long aliphatic chains
M²⁺, transition metal cation; Li⁺, lithium cation

GEL METHOD FOR PREPARATION OF CERAMIC MATERIAL

The present application is a U.S. National Stage Application based on and claiming benefit and priority under 35 U.S.C. § 371 of International Application No. PCT/US2013/026093, filed 14 Feb. 2013, the entirety of which is hereby incorporated by reference into the present application.

TECHNICAL FIELD

The present invention relates to a process for forming ceramic materials, and particularly to a process for forming ceramic materials via a sol-gel process, and more particularly to a process for forming ceramic materials suitable for use as a cathode material in a lithium ion battery, via a sol-gel process.

BACKGROUND

Ceramic materials and, in particular, ceramic materials for use in lithium ion battery cathodes, have been an intriguing research field for many years. Out of various ceramic materials suitable for use as lithium ion battery cathodes, lithium transition metal oxides stand out as the most successful category of such cathode material. The crystal structures of lithium transition metal oxides can be a layered structure with a chemical formula of $LiMO_2$ (M: Mn, Co, and Ni, etc.) and a three dimensional spinel structure with a typical chemical formula of $LiM_2O_4$ (M: Mn). Both the layered structure and the spinel structure are built up by transition metal and oxygen to form the framework, among which the lithium ions are intercalated.

Conventional methods for ceramic material preparation generally can be summarized as solid-state chemistry, co-precipitation, hydrothermal, sol-gel, and spray-drying. The conventional solid-state chemistry method has several disadvantages, including non-homogeneity, irregular morphology, larger particle size, broader particle size distribution, and poor control of stoichiometry. Thus, insufficient oxidization often occurs, resulting in an imperfect crystal structure that needs repeated calcinations to eliminate the imperfections. To overcome these drawbacks, improved methods, including co-precipitation, hydrothermal and spray-drying methods have been developed. However, these improved methods require either sophisticated and precise chemical reaction procedure control or complicated process and expensive equipment. Also these improved methods may cause environmental problem due to waste generated during the process. In addition to the above methods, sol-gel methods apparently offer a relatively simple and facile method, which either does not cause or causes fewer environmental problems. However, currently known sol-gel methods require a step to drive off the water in the solution at relatively high temperature, in order to achieve the gel state. This driving off of water is actually a concentrating step, needed to achieve a high concentration of solids, so that the resulting mixture will easily turn into a gel upon heating. One major drawback is that, during this step, phase separation among different components is quite possible, even likely, and this results in various non-homogeneities from this procedure. The non-homogeneities may present as one or more of irregular element distribution, irregular morphology, irregular and/or broad particle size distribution and irregular, non-uniform stoichiometry, which stoichiometric problems are especially serious for dopants. Such non-homogeneities can result in a need for additional processing and/or production of inferior ceramic products.

Thus, there has remained in the art a strong need for solving the problems of non-homogeneity, irregular morphology, larger particle size, broader particle size distribution, and poor control of stoichiometry, which have plagued the ceramic materials art for many years.

SUMMARY

The present invention provides an elegant solution to these long-standing problems in the art.

The present invention provides a sol-gel method for producing ceramic materials that can, in various embodiments: be carried out at room temperature without a separate step of solution concentration; ensure a high quality product having a high level of homogeneity of element distribution, especially trace dopant elements; provide better morphology; provide smaller particle size in a more narrow range of size distribution; and provide excellent, uniform stoichiometry. The resulting ceramic material may be used in cathode materials, particularly for lithium ion batteries, to provide an improved product, but is not limited to such use. The process is broadly applicable to a wide range of metal salts or oxides for use in preparing ceramic materials.

The invention described herein relates to a sol-gel method to prepare ceramic materials suitable for use, e.g., in manufacture of a wide range of ceramics, including, when lithium is present in the ceramic matrix, lithium ion battery cathodes, the method having one or more of the following advantages: (1) a room temperature sol-gel process; (2) no water removal needed during the sol-gel process; (3) a simple, one-step process; (4) an environmental-friendly process; (5) a uniform, fine particle formation; (6) a homogeneous material; (7) a homogeneous distribution of trace elements (dopants); (8) readily applicable for thin film formation; (9) readily applicable for manufacture of a wide range of cathode material.

Thus, in one embodiment, the present invention relates to a process for producing a ceramic material including:

providing an aqueous solution comprising at least one transition metal ion and one or more further transition metal ion and/or one or more additional ion;

adding to the aqueous solution a quaternary ammonium or phosphonium hydroxide comprising at least one alkyl group containing about 8 or more carbon atoms to form a combined aqueous solution;

mixing the combined aqueous solution to form a gel;

transferring the formed gel to a furnace; and heating the formed gel to a temperature sufficient for a time sufficient to calcine the gel to form a solid ceramic material.

In one embodiment, the formed gel is transferred directly to the furnace without an intervening step of water or solvent removal.

In one embodiment, the one or more additional ion includes a lithium ion.

In one embodiment, the at least one transition metal ion comprises one or more ion from Group 3-12 of the IUPAC periodic table. The transition metal may be any transition metal that is known for use in ceramic materials. In one embodiment, the transition metal is one known for use in lithium ion batteries.

In one embodiment, the at least one additional ion includes one or more ion selected from B, Al, Sn, Zn, Mg, Ga, Zr, Si, Ge and Ti. In one embodiment, the additional ion is present in a dopant quantity in the ceramic material.

In one embodiment, the at least one alkyl group contains from about 8 to about 40 carbon atoms, or from 12 to about 20 carbon atoms, or about 16 carbon atoms or about 18 carbon atoms. In one embodiment, the quaternary ammonium or phosphonium hydroxide further comprises three lower alkyl groups having from 1 to less than 8 carbon atoms, or from 1 to 4 carbon atoms.

In one embodiment, the quaternary ammonium or phosphonium hydroxide comprises two alkyl groups containing from about 8 to about 40 carbon atoms, or from 12 to about 20 carbon atoms, or about 16 or 18 carbon atoms. In one embodiment, the quaternary ammonium or phosphonium hydroxide further comprises two lower alkyl groups having from 1 to less than 8 carbon atoms, or from 1 to 4 carbon atoms.

In one embodiment, the at least one alkyl group containing about 8 or more carbon atoms is unbranched.

In one embodiment, the heating is conducted with stepwise increases to a final temperature in the range from about 750° C. to about 1000° C. In one embodiment, the heating is conducted in four steps, each step at a temperature greater than the previous step. In one embodiment, the heating is carried out for a total time of about 20 hours or more.

In accordance with the invention, any one or more of the foregoing embodiments may be combined with any one or more of the other of the foregoing embodiments, and the resulting combinations are all considered to fall within the scope of the disclosed and claimed invention.

DETAILED DESCRIPTION

Figure 1:
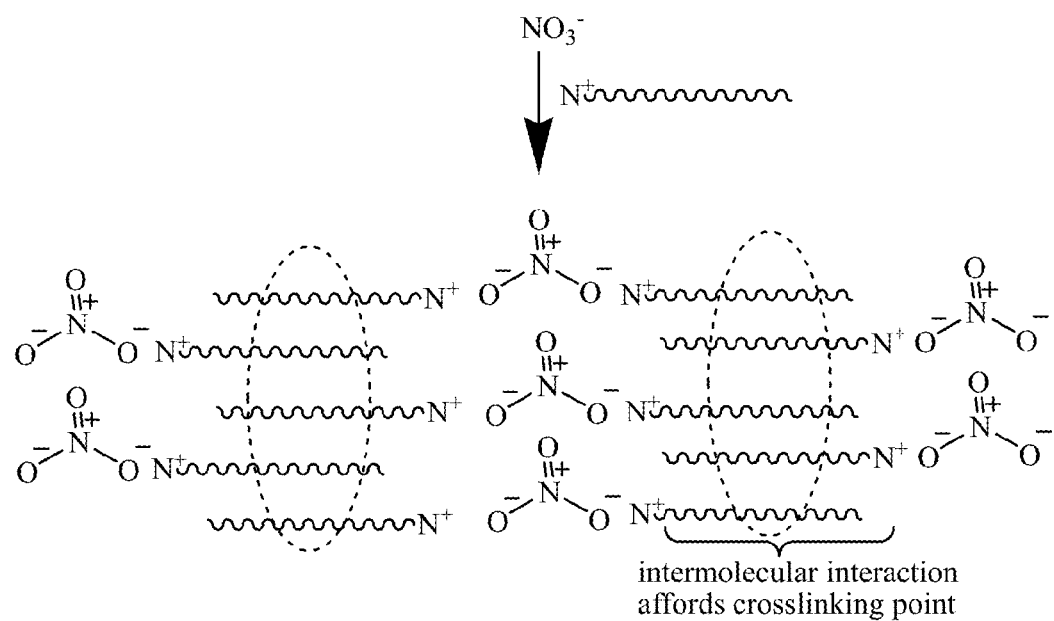
FIG. 1 is a schematic diagram of a first possible, theoretical mechanism of association of nitrate ions with quaternary ammonium molecules having a long alkyl chain, in accordance with an embodiment of the present invention.

As used herein, a dopant quantity, when used to describe the amount of an additional ion to be added to the aqueous solution and incorporated into the ceramic product to modify one or more of its properties, is an amount equal to or less than about 0.1 mole fraction of the elements present in the empirical formula other than the oxygen, where the total mole fraction of the elements present in the empirical formula other than oxygen is equal to one. Thus, for example, where the ceramic product has an empirical formula $M^1_xM^2_yM^3_zD^1_aO_m$, wherein $M^1$, $M^2$, and $M^3$ are transition metal ions or lithium ion, $D^1$ is an additional or dopant ion (of which there may be more than one, only one being shown here for brevity), x, y, z, a and m are the molar amounts of each element, x+y+z+a=1, any one or more of x, y, z and a may be zero, provided that at least two of x, y, z and a are non-zero, and m=1-3, or, usually, 2, as needed to obtain a neutral molecule of the ceramic product, each of the one or more additional or dopant ion(s) ($D$, $D^1$, $D^2$, etc.) present in a dopant quantity constitutes equal to or less than about 0.1 mole fraction of the elements other than oxygen present in the empirical formula. The foregoing formula may include additional metals, e.g., $M^4$, $M^5$, etc., and additional dopants and, if so, their mole fraction is included in the total equal to 1, and each dopant quantity remains equal to or less than 0.1 mole fraction. Thus, for example, the above empirical formula would be $M^1_vM^2_wM^3M^4_yM^5_zD^1_aD^2_bO_m$, in which v+w+x+y+z+a+b=1 and in which any one or more of v, w, x, y, z, a and b may be zero, provided that at least two of v, w, x, y, z, a and b are not zero and m is as above, and the mole fraction of each of a and b the additional or dopant ions $D^1$ and $D^2$ is equal to or less than 0.1. In one embodiment, a dopant quantity is an amount equal to or less than about 0.05 mole fraction, with mole fraction having the same meaning as defined above. When a=zero, no dopant is present. Any ion, whether a transition metal ion or an additional ion, that is present in a dopant quantity is considered to be a dopant ion.

When lithium is one of the metals M, the resultant ceramic material may be suitable for use as the cathode in a lithium ion battery.

As used herein, the articles "a", "an", and "the" are used interchangeably with "at least one" to mean one or more of the elements being described.

As used herein, the term "metal" refers to both metals and to metalloids such as carbon, silicon and germanium, whether in an elemental or ionic state.

All numbers are herein assumed to be modified by the term "about", unless the exact number is clearly intended. The recitation of numerical ranges by endpoints includes all numbers subsumed within that range (e.g., the range 1 to 5 includes, e.g., 1, 1.5, 2, 2.75, 3, 3.80, 4, and 5) and any sub-range within that range.

As described herein, the present invention relates to a process for producing a ceramic material including at least the following steps:

providing an aqueous solution comprising at least one transition metal ion and one or more further transition metal ion and/or one or more additional ion;

adding to the aqueous solution a quaternary ammonium or phosphonium hydroxide comprising at least one alkyl group containing about 8 or more carbon atoms to form a combined aqueous solution;

mixing the combined aqueous solution to form a gel;

transferring the formed gel to a furnace; and heating the formed gel to a temperature sufficient for a time sufficient to calcine the gel to form a solid ceramic material.

In one embodiment, the formed gel is transferred directly to the furnace without an intervening step of water or solvent removal.

In one embodiment, the one or more additional ion includes a lithium ion.

In one embodiment, the at least one transition metal ion comprises one or more ion from Group 3-12 of the IUPAC periodic table. The transition metal may be any transition metal that is known for use in ceramic materials. In one embodiment, the transition metal is one known for use in lithium ion batteries.

In one embodiment, the additional ion comprises B, Al, Sn, Zn, Mg, Ga, Zr, Si, Ge and Ti, provided that the additional ion is different from the transition metal ion(s) present in the ceramic material. In one embodiment, the additional ion is present in the ceramic material in a dopant quantity, as defined herein. To the extent that any of the foregoing additional ions are also transition metal ions, if the ion is present in a dopant quantity as defined herein, then it is a dopant ion, otherwise it is one of the aforementioned transition metal ions.

The ceramic material according to the present invention may include a plurality of metal ions and metalloid ions. In one embodiment, the ceramic product has an empirical formula $M^1_xM^2_yM^3_zD^1_aO_m$, wherein $M^1$, $M^2$, and $M^3$ are transition metal ions as defined above, in which one of the M ions may be lithium ion, $D^1$ is an additional or dopant ion (of which there may be more than one, only one being shown here for brevity), x, y, z, a and m are the molar fractions of each element present in the ceramic material, and x+y+z+a=1, and any one or more of x, y, z and a may be zero, provided that at least two of x, y, z and a are non-zero, and m=1-3, or, usually, 2, as needed to obtain a neutral molecule of the ceramic product. The foregoing formula may include additional metals, e.g., $M^4$, $M^5$, etc., and additional dopants and, if so, their mole fraction is included in the total that is equal to 1, and each dopant quantity remains equal to or less than 0.1 mole fraction. Thus, for example, the above empirical formula would be $M^1_vM^2_wM^3_xM^4_yM^5_zD^1_aD^2_bO_m$, in which v+w+x+y+z+a+b=1 and in which any one or more of v, w, x, y, z, a and b may be zero, provided that at least two of v, w, x, y, z, a and b c are not zero and m is as above, and the mole fraction of each of a and b the dopant ions $D^1$ and $D^2$ is equal to or less than 0.1. As noted, additional ions in dopant quantities may be included. When any additional ion(s) is/are present in dopant quantities, the dopant quantity limitation applies to each such additional (dopant) ion. Thus, each additional (dopant) ion present in dopant quantities has a mole fraction equal to or less than 0.1 of the total of all mole fractions (other than the oxygen), which is 1.

The foregoing transition metal ions and additional ions may be provided to the process in the form of any suitable salt or oxide. In one embodiment, the transition metal ions and the additional ions are provided as the nitrate salt. If the transition metal ion and additional ion are provide as oxides, and placed into a solution of nitric acid, the oxides are generally considered to be converted to the nitrate salt, due to the much larger nitrate ion content, and to the water molecule formation resulting from protonation of the oxide oxygen atoms. While other polyoxygen anions, such as sulfate ($SO_4^{-2}$), phosphate ($PO_4^{-3}$), pyrophosphate (P) etc., could be used, nitrate ($NO_3^-$), is preferred herein.

In one embodiment, the at least one alkyl group contains from about 8 to about 40 carbon atoms, or from 12 to about 20 carbon atoms, or about 16 carbon atoms or about 18 carbon atoms. In one embodiment, the quaternary ammonium or phosphonium hydroxide further comprises three lower alkyl groups having from 1 to less than 8 carbon atoms, or from 1 to 4 carbon atoms.

In one embodiment, the quaternary ammonium or phosphonium hydroxide comprises two alkyl groups containing from 8 to about 40 carbon atoms, or from 12 to about 20 carbon atoms, or about 16 or 18 carbon atoms. In one embodiment, the quaternary ammonium or phosphonium hydroxide further comprises two lower alkyl groups having from 1 to less than 8 carbon atoms, or from 1 to 4 carbon atoms. In one embodiment, the longer alkyl chain contains sixteen carbon atoms, is unbranched, and the other three alkyl groups are methyl groups, thus, the quaternary ammonium or phosphonium would be hexadecyltrimethyl ammonium (see, e.g., the Examples) or phosphonium hydroxide.

In one embodiment, any of the foregoing at least one alkyl group containing about 8 or more carbon atoms is unbranched.

Both the number of long-chain alkyl groups, e.g., one or two, and the length of the long chain alkyl groups, e.g., 8-40 carbon atoms on the quaternary ammonium or phosphonium molecule, is limited by the solubility of the quaternary ammonium or phosphonium molecule in the aqueous acidic medium in which the various ions are combined. The size of the other three or two alkyl groups on the quaternary ammonium or phosphonium molecule will also have some effect on this limitation, as will the branching or absence thereof, of the alkyl groups. That is, if the length and/or number of longer alkyl substituents is too great, the resulting quaternary ammonium or phosphonium molecule may not be sufficiently soluble. Thus, as will be understood, the actual, practical limit on the size of the alkyl group containing from 8 to about 40 carbon atoms, as well as whether there is one or two such substituents, is the solubility of the resulting quaternary ammonium or phosphonium molecule.

Although not to be limited by theory, it is considered that there are three primary molecular and/or ionic associations between molecules that leads to the gel formation on which the present invention functions.

The first of the three primary associations is between the negatively charged nitrate ion and the positively charged quaternary ammonium or phosphonium ion.

The second of the three primary associations is the intermolecular interaction between the long alkyl groups of adjacent quaternary ammonium and/or phosphonium molecules, which provides a sort of "crosslinking" point between the adjacent quaternary ammonium and/or phosphonium molecules. It is this "crosslinking" that is considered to provide the binding force to maintain the gel formed in accordance with the present invention. The term "crosslinking" is in quotation marks to indicate that this is generally not a chemical bond-based crosslinking, in which an actual covalent bond would be formed between the alkyl groups on adjacent quaternary ammonium and/or phosphonium molecules, but is instead the type of association between adjacent long-chain alkyl groups that occurs in micelle formation in surfactant-containing aqueous solutions. That said, it is considered that, in the present invention, the intermolecular interactions are not actual micelle-forming interactions, but that the interactions are similar to those schematically depicted in FIGS. 1 and 2, which are described in more detail below. As suggested by the schematic depictions in FIGS. 1 and 2, it is considered that there are generally two quaternary ammonium or phosphonium molecules associated with each nitrate ion. It is noted, again, that this is the theory under which the present invention is presently understood, but the present inventor and invention are not to be limited by this or any other theory.

Figure 3:
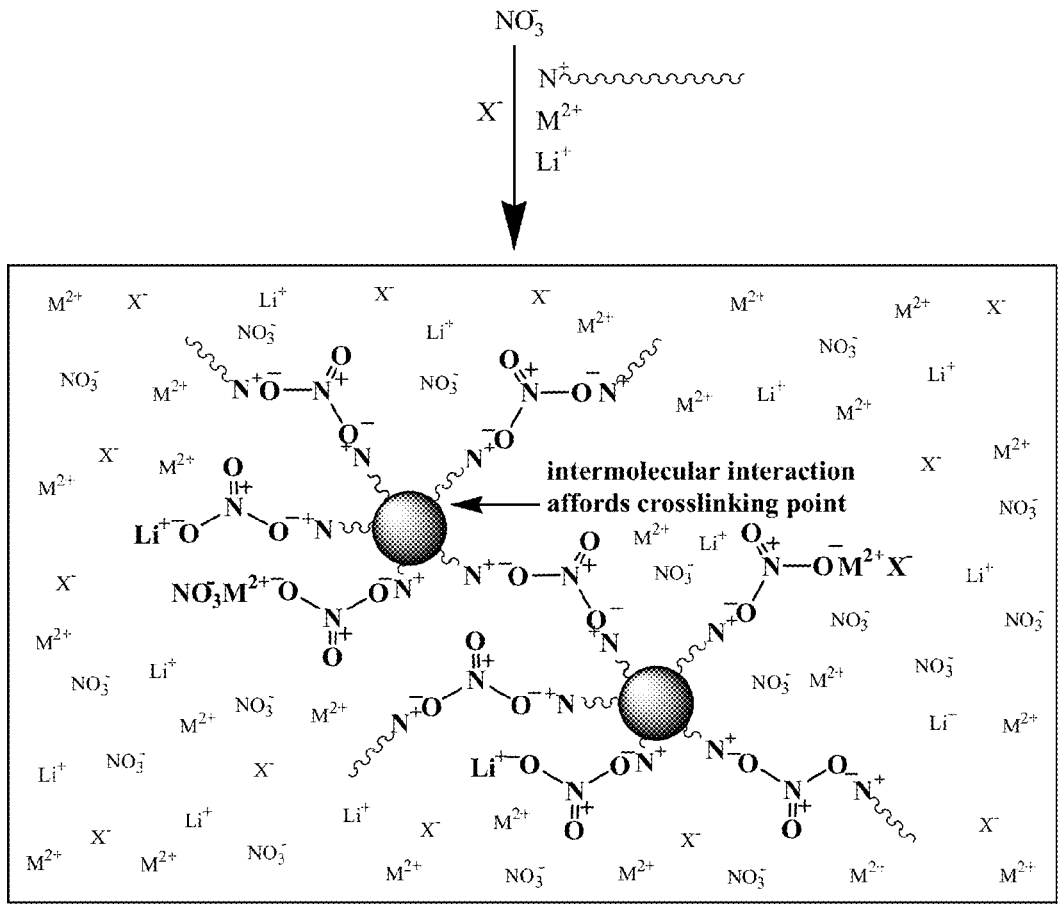
FIG. 3 is a schematic diagram of a third possible, theoretical mechanism of association of transition metal ions, nitrate ions and quaternary ammonium molecules having a long alkyl chain, in accordance with an embodiment of the present invention.

The third of the three primary associations is between the nitrate ions and the transition metal ions and additional ions, as depicted in FIG. 3.

FIG. 1 is a schematic diagram of a first possible, theoretical mechanism of association of nitrate ions with quaternary ammonium molecules having a long alkyl chain, in accordance with an embodiment of the present invention.

The associations depicted in FIG. 1 may be the initial association obtained upon mixing the nitrate ions with the quaternary ammonium ions.

Figure 2:
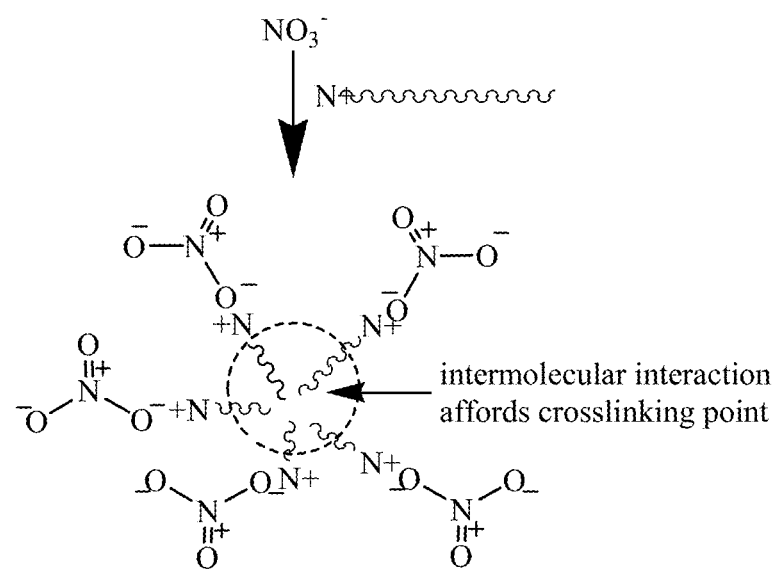
FIG. 2 is a schematic diagram of a second possible, theoretical mechanism of association of nitrate ions with quaternary ammonium molecules having a long alkyl chain, in accordance with an embodiment of the present invention.

FIG. 2 is a schematic diagram of a second possible, theoretical mechanism of association of nitrate ions with quaternary ammonium molecules having a long alkyl chain, in accordance with an embodiment of the present invention. The associations depicted in FIG. 2 may be the later, more developed association obtained some time after mixing the nitrate ions with the quaternary ammonium ions.

FIG. 3 is a schematic diagram of a third possible, theoretical mechanism of association of transition metal ions, nitrate ions and quaternary ammonium molecules having a long alkyl chain, in accordance with an embodiment of the present invention. The associations depicted in FIG. 3 are believed to more correctly depict the various associations between lithium ions, transition metal ions, quaternary ammonium or phosphonium ions and counterions that were associated with the quaternary ammonium or phosphonium ions and, if so provided, with the transition metal ions and additional ions. The "crosslinking" between the respective quaternary ammonium long alkyl chains is depicted in FIG. 3 as the shaded circles or balls, and is schematic only, there being no intention to show this relationship as a ball or sphere, but rather simply to indicate that the long alkyl chains are "crosslinked" or intimately associated with each other.

As described in the examples, the process is usually carried out by first combining the various transition metal salts or oxides, lithium salt(s), optionally dopant salts or oxides, and water, to afford an aqueous solution of these salts. If the salts are added as the nitrate salts, it is not necessary separately to add another source of nitrate ions, such as nitric acid.

In one embodiment, the heating is conducted with stepwise increases to a final temperature in the range from about 750° C. to about 1000° C. In one embodiment, the heating is conducted in four steps, each step at a temperature greater than the previous step. In one embodiment, the heating is carried out for a total time of about 20 hours or more.

In accordance with embodiments of the present invention, salts of lithium (if present), salts of the selected transition metals, and salts of any additional and/or dopant elements to be included, are combined in water and stirred until thoroughly dissolved (usually overnight), when a clear solution is obtained. While stirring vigorously, the requisite amount of the long-chain quaternary ammonium or phosphonium hydroxide is added, upon which addition, a colored gel quickly forms. In accordance with embodiments of the present invention, the thus-formed gel can be immediately and directly placed into a furnace for calcining, without any further concentration or removal of water. In the furnace, the temperature is gradually ramped up in a stepwise fashion.

A typical, exemplary ramping procedure with hold times at various temperatures in the calcining process is the following:

1. Place gel in furnace at 150° C., hold for 0.5 hour;
2. Ramp furnace temperature from 150° C. to 180° C. at 5° C./minute, hold at 180° C. for 5 hours;
3. Ramp furnace temperature from 180° C. to 480° C. at 5° C./minute, hold at 480° C. for 5 hours;
4. Ramp furnace temperature from 480° C. to 900° C. at 5° C./minute, hold at 900° C. for 10 hours;
5. Remove ceramic powder from furnace, allow to cool to room temperature.

As will be recognized by the skilled artisan, the exact times and temperatures used may be varied, provided that the gel is thoroughly calcined. The ramping helps to bring through the changes, to form a nascent ceramic and finally a fully calcined ceramic material.

The present invention is broadly applicable for production of ceramic materials, and is particularly useful for preparation of ceramic materials suitable for use in cathode materials for lithium ion batteries. The following exemplary materials, some of which may be useful for cathode materials for lithium ion batteries, and can be produced according to the present invention:

lithium nickel manganese cobalt oxide, $LiNi_{0.33}Mn_{0.33}Co_{0.33}O_2$ lithium nickel cobalt aluminum oxide, $LiNi_{0.8}Co_{0.15}Al_{0.05}O_2$ lithium nickel cobalt aluminum oxide, $LiNi_{0.79}Co_{0.20}Al_{0.01}O_2$ lithium nickel cobalt oxide, $LiNi_{0.8}Co_{0.20}O_2$ lithium iron phosphate, $LiFePO_4$ lithium nickel oxide, $LiNiO_2$ lithium trivanadate, $LiV_3O_8$ manganese nickel carbonate; $Mn_{0.75}Ni_{0.25}CO_3$ copper vanadium oxide, $CuV_2O_6$ lithium cobalt phosphate, $LiCoPO_4$ lithium manganese dioxide, $LiMnO_2$ lithium manganese oxide, $LiMn_2O_4$ lithium manganese nickel oxide, $Li_2Mn_3NiO_8$ lithium iron oxide, $LiFeO_2$ lithium cobalt oxide, $LiCoO_2$ lithium molybdate, $LiMoO_4$ lithium titanate, $Li_2TiO_3$ lithium cobalt manganese oxide, $LiCo_{0.8}Mn_{0.2}O_2$ lithium nickel manganese oxide, $LiNi_{0.85}Mn_{0.15}O_2$ lithium cobalt nickel manganese oxide, $LiCo_{0.45}Ni_{0.45}Mn_{0.10}O_2$ lithium nickel manganese oxide, $LiNi_{0.8}Mn_{0.2}O_2$ lithium nickel cobalt boron oxide, $LiNi_{0.79}Co_{0.2}B_{0.01}O_2$ lithium nickel cobalt tin oxide, $LiNi_{0.79}Co_{0.2}Sn_{0.01}O_2$ lithium nickel cobalt aluminum oxide, $LiNi_{0.72}Co_{0.2}B_{0.08}O_2$ The oxide compounds formed in accordance with the present invention can be generalized, and some exemplary compounds are shown in the following:

lithium nickel cobalt oxide, $LiNi_xCo_{1-x}O_2$ doped lithium nickel cobalt oxide, $LiNi_xCo_{1-x-d}M_dO_2$, where M is an additional ion and d=0.1 or less, and is therefore a dopant ion lithium nickel manganese cobalt oxide, $LiNi_xMn_yCo_zO_2$, where x+y+z=1 doped lithium nickel manganese cobalt oxide, $LiNi_xMn_yCo_zM_dO_2$, where x+y+z+d=1, M is an additional ion and d=0.1 or less, and is therefore a dopant ion lithium cobalt manganese oxide, $LiCo_xMn_{1-x}O_2$ doped lithium cobalt manganese oxide, $LiCo_xMn_{1-x-d}M_dO_2$, where M is an additional ion and d=0.1 or less, and is therefore a dopant ion lithium nickel manganese oxide, $LiNi_xMn_{1-x}O_2$ doped lithium nickel manganese oxide, $LiNi_xMn_{1-x-d}M_dO_2$, where M is an additional ion and d=0.1 or less, and is therefore a dopant ion lithium cobalt nickel manganese oxide, $LiCo_xNi_yMn_zO_2$ doped lithium cobalt nickel manganese oxide, $LiCo_xNi_yMn_zM_dO_2$, where x+y+z+d=1, M is an additional ion and d=0.1 or less, and is therefore a dopant ion.

It is noted that in the foregoing, the various doped compounds are shown with a single dopant ion. This is for illustrative purposes only and, as will be recognized, more than one dopant ion may be added to any of the foregoing compounds.

The foregoing compounds are ceramic materials that may be made according to various embodiments of the present invention, and as further described herein and illustrated in several of the above-listed compounds, can include dopants added to slightly vary the above-indicated stoichiometry and the resulting properties of the ceramic material thus produced. One example of a doped ceramic is the above-listed lithium nickel cobalt aluminum oxide, $LiNi_{0.8}Co_{0.15}Al_{0.05}O_2$, which contains a dopant quantity of aluminum (less than about 0.1 mole fraction) in addition to the lithium, nickel, cobalt and oxygen that would otherwise be present in un-doped lithium nickel cobalt oxide, $LiNi_{0.8}Co_{0.2}O_2$.

In one embodiment, the lithium ceramic material for use in lithium ion battery cathode may be a compound having one of the following formulae:

$Li_xNi_{1-y}CoO_2$, wherein $0.9 \le x \le 1.1$ and $0 \le y \le 1.0$;

$Li_{1+a}M^1_bMn_{2-b}O_4$, wherein $-0.1 \le a \le 0.2$ and $0 \le b \le 1.0$, $M^1$ is one of Li, B, Mg, Al, Ti, Cr, Fe, Co, Ni, Cu, Zn, Ga, Y, F, I and S; and $Li_mMn_{2-n}M^2_nO_2$, wherein $M^2$ is a transition metal, $0.9 \le m \le 1.1$ and $0 \le n \le 1.0$.

The quantity of water in which the transition metal compounds, dopant metal compounds and lithium compounds are initially dissolved can be varied as needed. The quantity of water should be as low as possible, just enough to provide complete dissolution of all of the transition metal and/or additional compounds and any other species added to the solution. In general, the less water present, the better the results from the gel formed. In one embodiment, the solution obtained by dissolving the selected transition metal compounds, dopant compounds and lithium compounds is saturated or as close to saturation as can be achieved consistent with complete and timely dissolution.

The as-prepared transition metal salt solution, or mixed transition metal salts solution, preferably with nitrate as the salt counterion to the metal ion, includes a nitrate ion associated with a quaternary ammonium or phosphonium cations having at least one alkyl group containing about 8 to about 40 carbon atoms to afford a transition metal or mixed transition metal polyanion salt, as illustrated in FIGS. 1-3. Moreover, the long aliphatic chain on the quaternary ammonium or phosphonium cation can form strong intermolecular interactions as depicted in FIGS. 1-3, affording crosslinking or association between the alkyl groups containing the about 8 to about 40 carbon atoms. It is believed that these associations result in sol-gel formation. However, the present invention does not require that a sol-gel or gel be formed in every case. As shown in Example 4 below, in which a gel was not formed, a ceramic material is successfully formed, in accordance with the present invention. This example is considered to be within the scope of the invention, despite that a gel is not actually formed.

The as-obtained sol-gel is directly heated to high temperature to accomplish calcination and to form a ceramic material having improved properties. A ceramic material suitable for use as the cathode in a lithium ion battery is thereby prepared. The production of the actual cathode for a lithium ion battery from the ceramic material can be accomplished by techniques known to those of skill in the art, and is beyond the scope of the present disclosure. As noted, the ceramic material may also be useful for other purposes for which ceramic materials are known.

EXAMPLES

Example 1: Preparation of Lithium Nickel Cobalt Oxide $LiCo_{0.2}Ni_{0.8}O_2$

Figure 4:
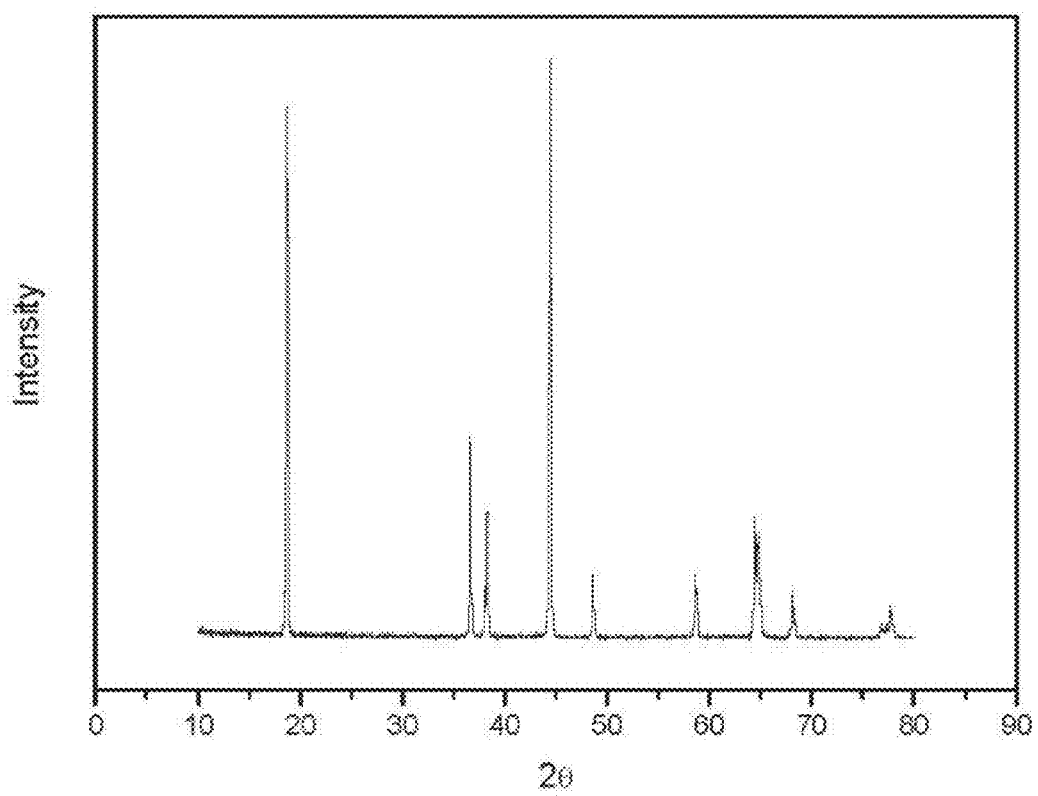
FIGS. 4-14 are X-ray diffraction spectra of ceramic materials made in accordance with the present invention.

To a 100 ml plastic beaker with a magnetic stirring bar, is added 3.8908 g (0.01338 mol) nickel nitrate hexahydrate, 0.9734 g (0.003345 mol) cobalt nitrate hexahydrate, 1.7915 g (0.01756 mol, 1.05 molar excess) lithium acetate dihydrate and 5.2690 g DI-water. The mixture is stirred overnight to afford a clear solution. To this solution under vigorous stirring, is added 17 g of 10.98 wt hexadecyltrimethylammonium hydroxide. A green gel is formed. The as-prepared gel is immediately moved into a furnace and is heated by the following step-wise temperature ramping procedure:
150° C./0.5 hour, 180° C./5 hours, 480° C./5 hours, 900° C./10 hours. A black solid is formed with quantitative yield. The XRD spectrum is shown in FIG. 4.

Example 2: Preparation of Lithium Nickel Cobalt Oxide $LiCo_{0.2}Ni_{0.8}O_2$

Figure 5:
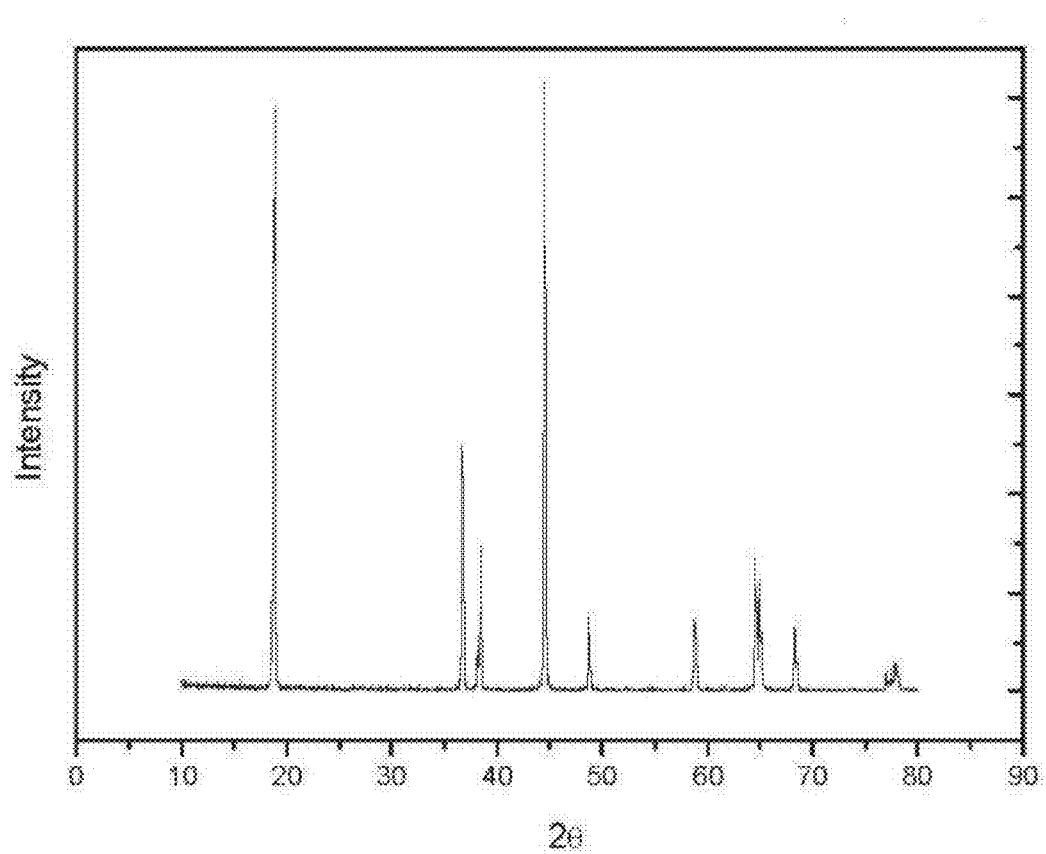

To a 100 ml plastic beaker with a magnetic stirring bar, is added 3.8908 g (0.01338 mol) nickel nitrate hexahydrate, 0.9734 g (0.003345 mol) cobalt nitrate hexahydrate, 1.7915 g (0.01756 mol, 1.05 molar excess) lithium acetate dihydrate and 3.3443 g DI-water. The mixture is stirred overnight to afford clear solution. To this solution under vigorous stirring, is added 20 g of 10.98% wt hexadecyltrimethylammonium hydroxide. The solution turns into a green gel. The as-prepared gel is immediately moved into a furnace and is heated by the following step-wise temperature ramping procedure:
150° C./0.5 hour, 180° C./5 hours, 480° C./5 hours, 900° C./10 hours. A black solid is formed with quantitative yield. The XRD spectrum is shown in FIG. 5.

Example 3: Preparation of Lithium Nickel Cobalt Oxide $LiCo_{0.2}Ni_{0.8}O_2$

Figure 6:
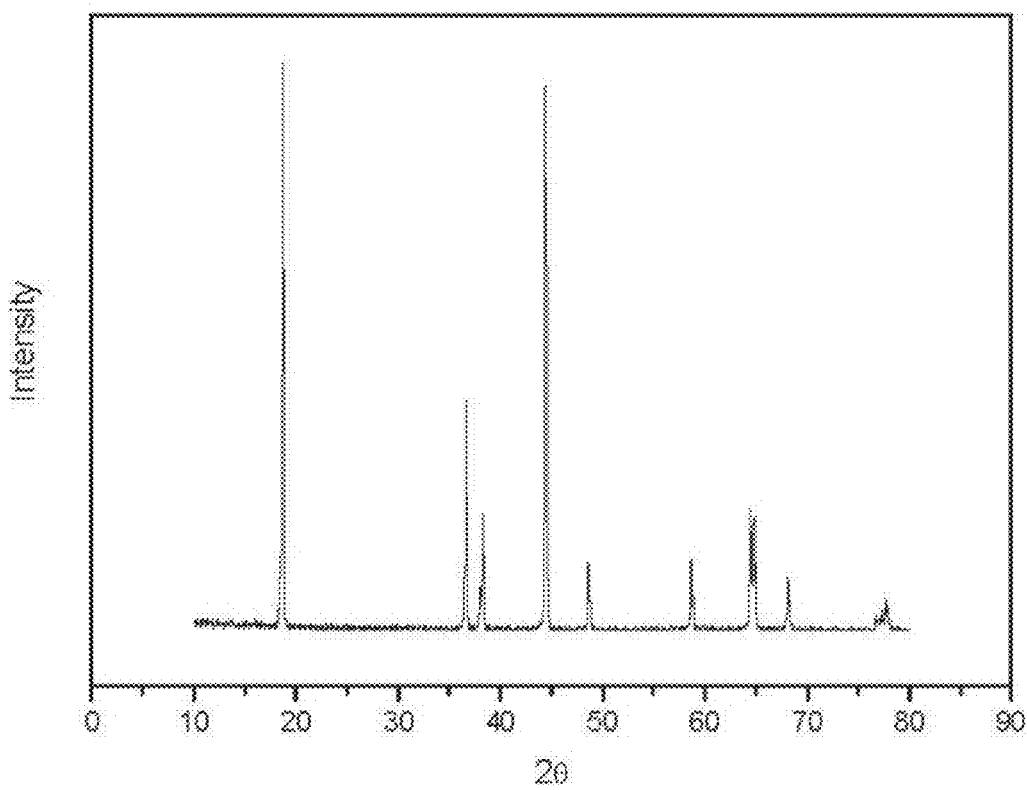
Figure 16:
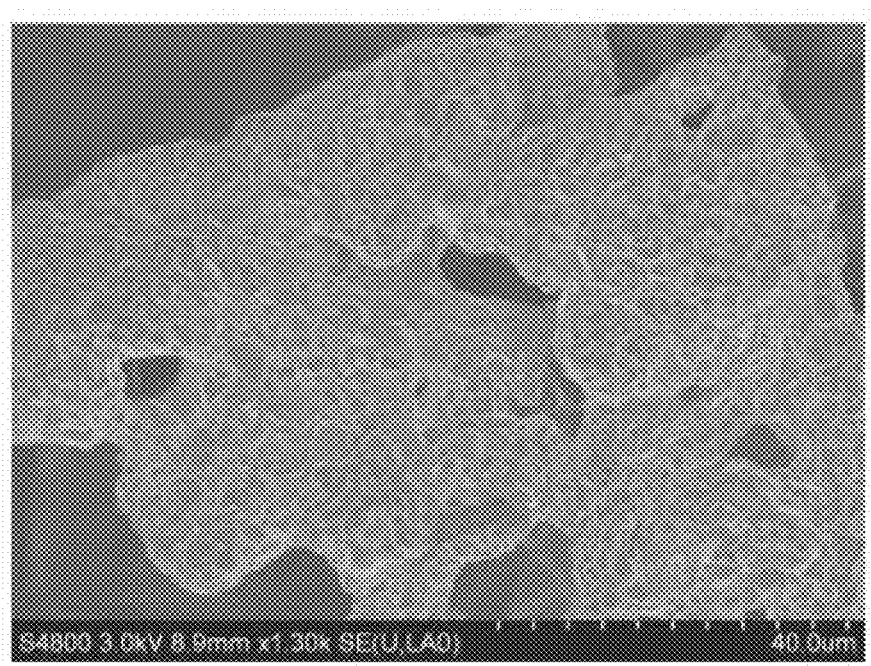
FIG. 16-18 are SEM photographs of lithium transition metal oxide ceramic materials made in accordance with embodiments of the present invention.
Figure 16:

To a 100 ml plastic beaker with a magnetic stirring bar, is added 3.8908 g (0.01338 mol) nickel nitrate hexahydrate, 0.9734 g (0.003345 mol) cobalt nitrate hexahydrate, 1.7915 g (0.01756 mol, 1.05 molar excess) lithium acetate dihydrate and 3.3443 g DI-water. The mixture is stirred overnight to afford a clear solution. To this solution under vigorous stirring, is added 29 g of 10.98% wt hexadecyltrimethylammonium hydroxide. The solution turns into a green gel. The as-prepared gel is immediately moved into a furnace and is heated by the following step-wise temperature ramping procedure:
150° C./0.5 hour, 180° C./5 hours, 480° C./5 hours, 900° C./10 hours. A black solid is formed with quantitative yield. The XRD spectrum is shown in FIG. 6. A scanning electron microscope (SEM) photograph of the $LiCo_{0.2}Ni_{0.8}O_2$ ceramic material obtained in accordance with this embodiment of the present invention is shown in FIG. 16.

Example 4: Preparation of Lithium Manganese Oxide $LiMn_2O_4$

Figure 7:
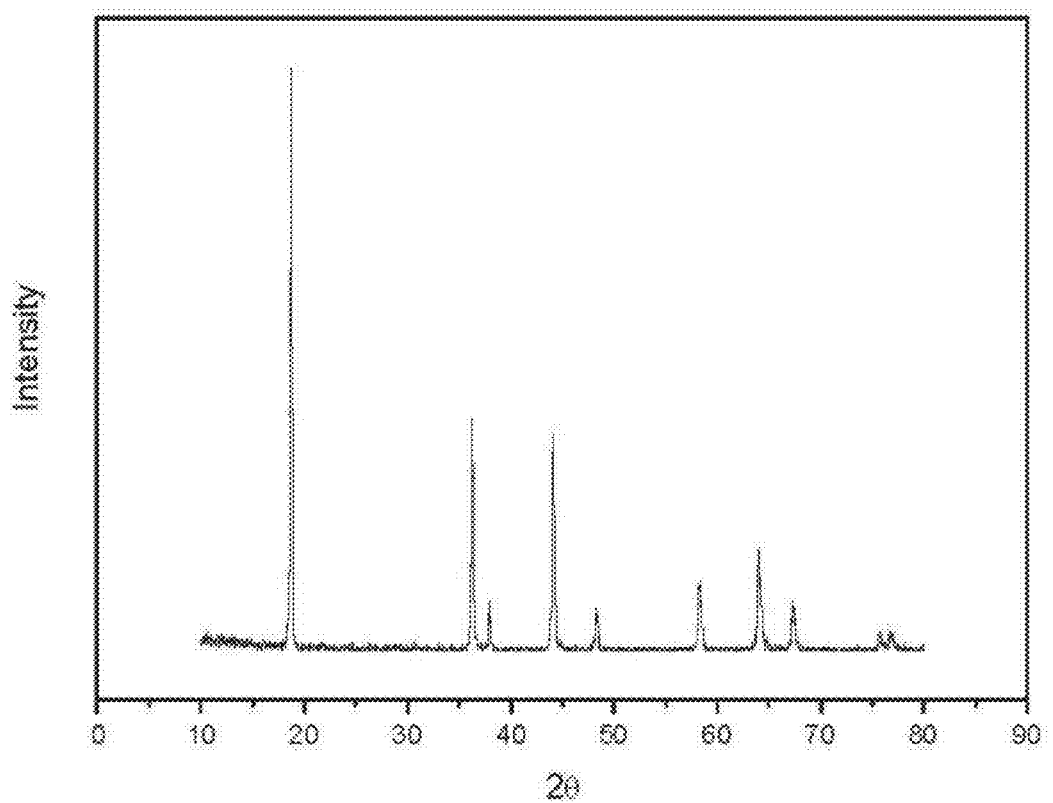
Figure 17:
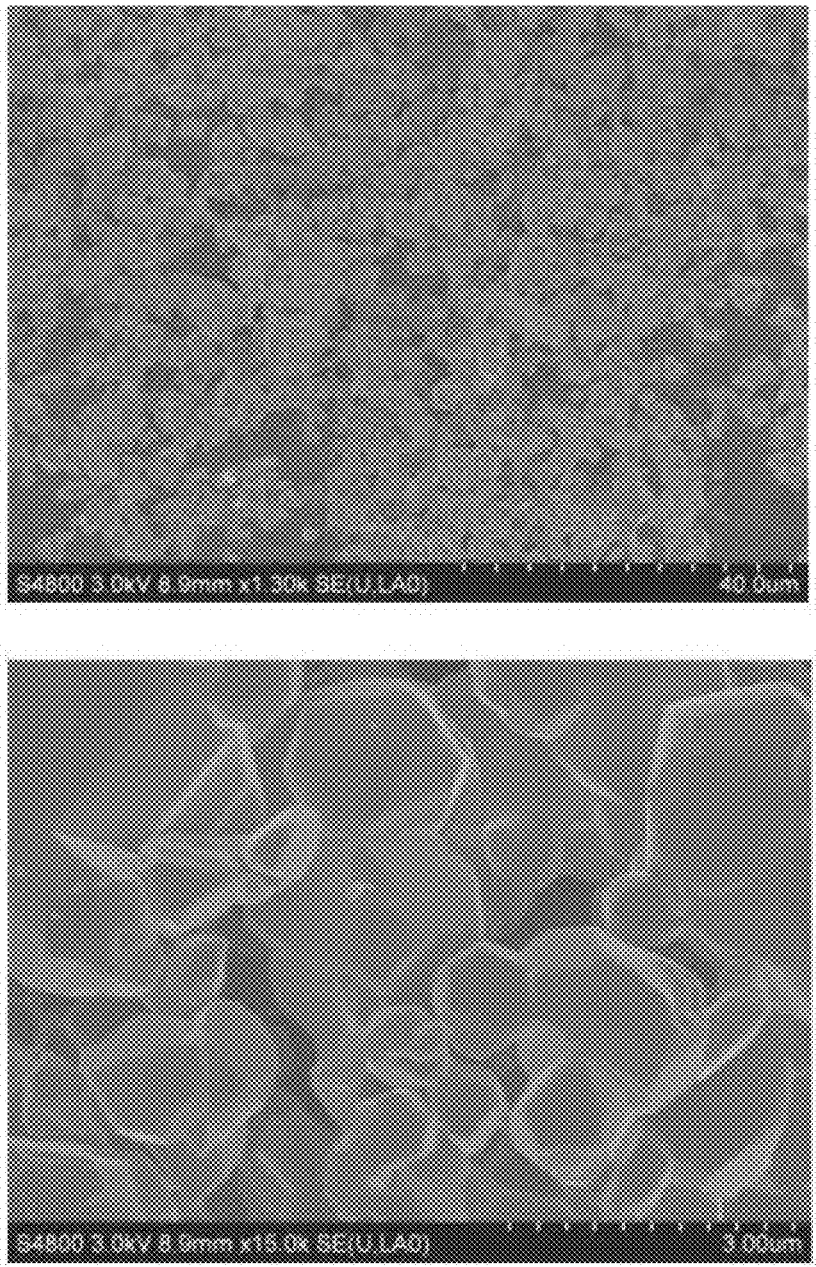

To a 100 ml plastic beaker with a magnetic stirring bar, is added 4.9164 g (0.02006 mol) manganese nitrate tetrahydrate, 1.0744 g (0.01053 mol, 1.05 molar excess) lithium acetate dihydrate and 8.0238 g DI-water. The mixture is stirred overnight to afford a clear solution. To this solution under vigorous stirring, is added 20 g of 10.98% wt hexadecyltrimethylammonium hydroxide. The solution turns into blue, but no gel forms. The mixture is heated at 140° C. to remove the water. A yellow sticky mixture is formed. The as-prepared mixture is immediately moved into a furnace and is heated by the following step-wise temperature ramping procedure:
150° C./0.5 hour, 180° C./5 hours, 480° C./5 hours, 900° C./10 hours. A black solid is formed with quantitative yield. The XRD spectrum is shown in FIG. 7. This is an example of a non-sol-gel embodiment of the present invention. A scanning electron microscope (SEM) photograph of the $LiMn_2O_4$ ceramic material obtained in accordance with this embodiment of the present invention is shown in FIG. 17.

Example 5 Preparation of Lithium Manganese Nickel Oxide $Li_2Mn_3NiO_8$

Figure 8:
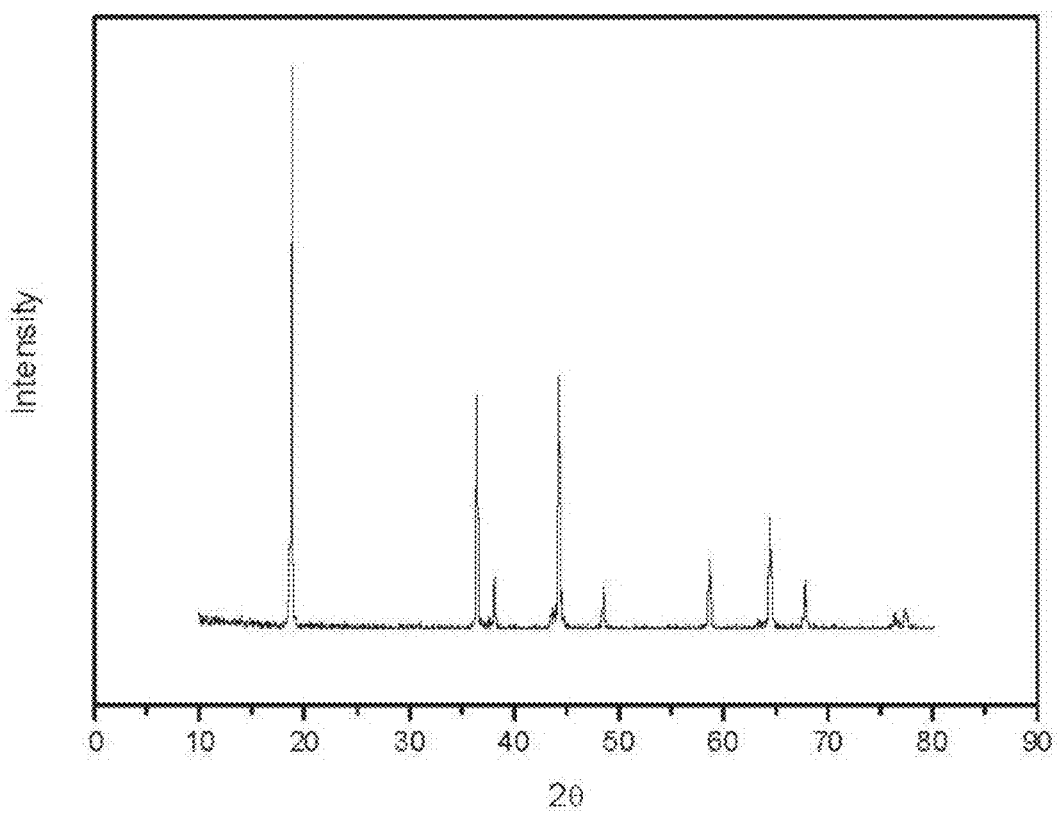

To a 100 ml plastic beaker with a magnetic stirring bar, is added 3.6053 g (0.01471 mol) manganese nitrate tetrahydrate, 1.0505 g (0.0103 mol, 1.05× excess) lithium acetate dehydrate, 1.4259 g (0.004903 mol) nickel nitrate hexahydrate and 7.9394 g DI-water. The mixture is stirred overnight to afford a clear solution. To above solution under vigorous stirring, is added 7.4964 g of 10.98% wt hexadecyltrimethyl ammonium hydroxide. The solution turns into a green gel. The as-prepared gel is immediately moved into a furnace and is heated by the following step-wise temperature ramping procedure:
150° C./0.5 hour, 180° C./5 hours, 480° C./5 hours, 900° C./10 hours. A black solid is formed with quantitative yield. The XRD spectrum is shown in FIG. 8.

Example 6 Preparation of Lithium Cobalt Oxide $LiCoO_2$ in Air Atmosphere

Figure 9:
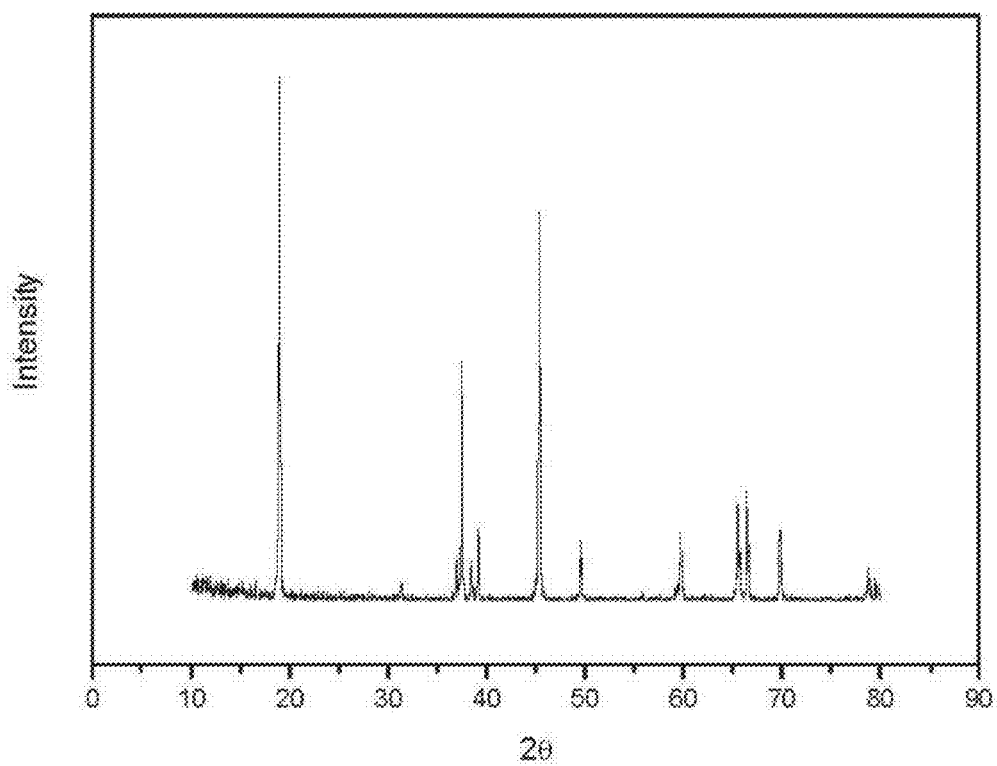

To a 100 ml plastic beaker with a magnetic stirring bar, is added 4.8654 g (0.01672 mol) cobalt nitrate hexahydrate, 1.7909 g (0.01755 mol, 1.05× excess) lithium acetate dihydrate and 3.3437 g DI-water. The mixture is stirred overnight to afford a clear solution. To this solution, under vigorous stirring, is added 20 g of 10.98% wt hexadecyltrimethyl ammonium hydroxide. The solution turns into a blue gel. The as-prepared gel is immediately moved into a furnace and is heated by the following step-wise temperature ramping procedure:
150° C./0.5 hour, 180° C./5 hours, 480° C./5 hours, 900° C./10 hours. A black solid is formed with quantitative yield. The XRD spectrum is shown in FIG. 9.

Example 7 Preparation of Lithium Cobalt Oxide $LiCoO_2$ in $N_2$ Atmosphere

Figure 10:
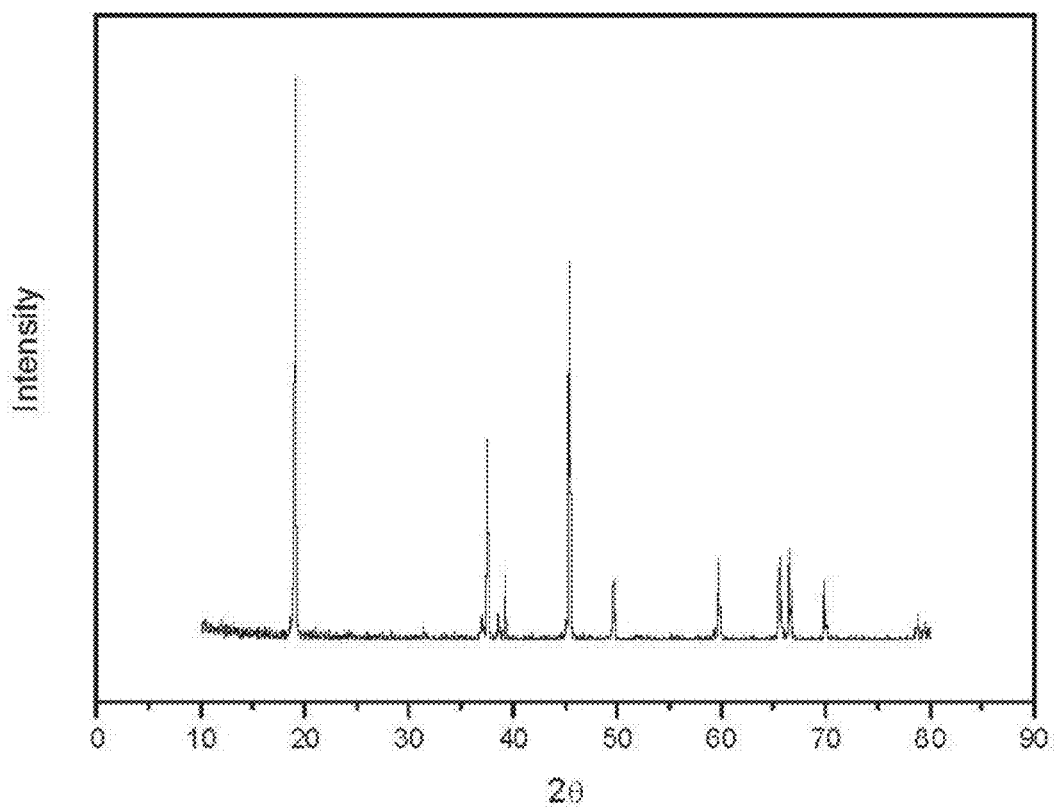

To a 100 ml plastic beaker with a magnetic stirring bar, is added 4.8654 g (0.01672 mol) cobalt nitrate hexahydrate, 1.7909 g (0.01755 mol, 1.05× excess) lithium acetate dihydrate and 3.3437 g DI-water. The mixture is stirred overnight to afford a clear solution. To this solution, under vigorous stirring, is added 20 g of 10.98% wt hexadecyltrimethyl ammonium hydroxide. The solution turns into a blue gel. The as-prepared gel is immediately moved into a furnace and is heated by the following step-wise temperature ramping procedure:
150° C./0.5 hour, 180° C./5 hours, 480° C./5 hours, 900° C./10 hours. A black solid is formed with quantitative yield. The XRD spectrum is shown in FIG. 10.

Figure 11:
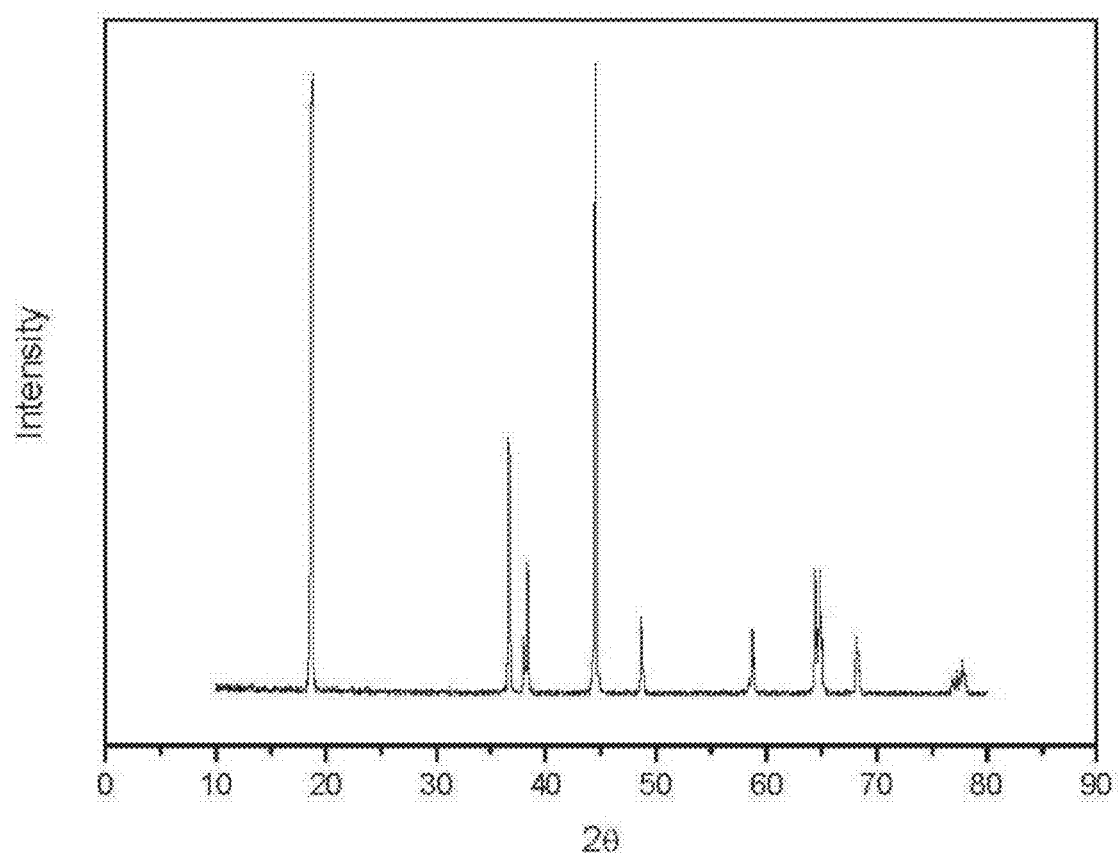

Example 8 Preparation of Aluminum-Doped Lithium Nickel Cobalt Oxide $LiNi_{0.79}Co_{0.2}Al_{0.01}O_2$ To a 100 ml plastic beaker with a magnetic stirring bar, is added 3.8366 g (0.01319 mol) nickel nitrate hexahydrate, 0.9720 g (0.00334 mol) cobalt nitrate hexahydrate, 0.06266 g (0.000167 mol) aluminum nitrate nonahydrate, 1.7889 g (0.01753 mol, 1.05× excess) lithium acetate dihydrate and 3.3398 g DI-water. The mixture is stirred overnight to afford a clear solution. To this solution, under vigorous stirring, is added 20 g of 10.98% wt hexadecyltrimethyl ammonium hydroxide. The solution turns into a green gel. The as-prepared gel is immediately moved into a furnace and is heated by the following step-wise temperature ramping procedure:
150° C./0.5 hour, 180° C./5 hours, 480° C./5 hours, 900° C./10 hours. A black solid is formed with quantitative yield. The XRD spectrum is shown in FIG. 11.

Figure 12:
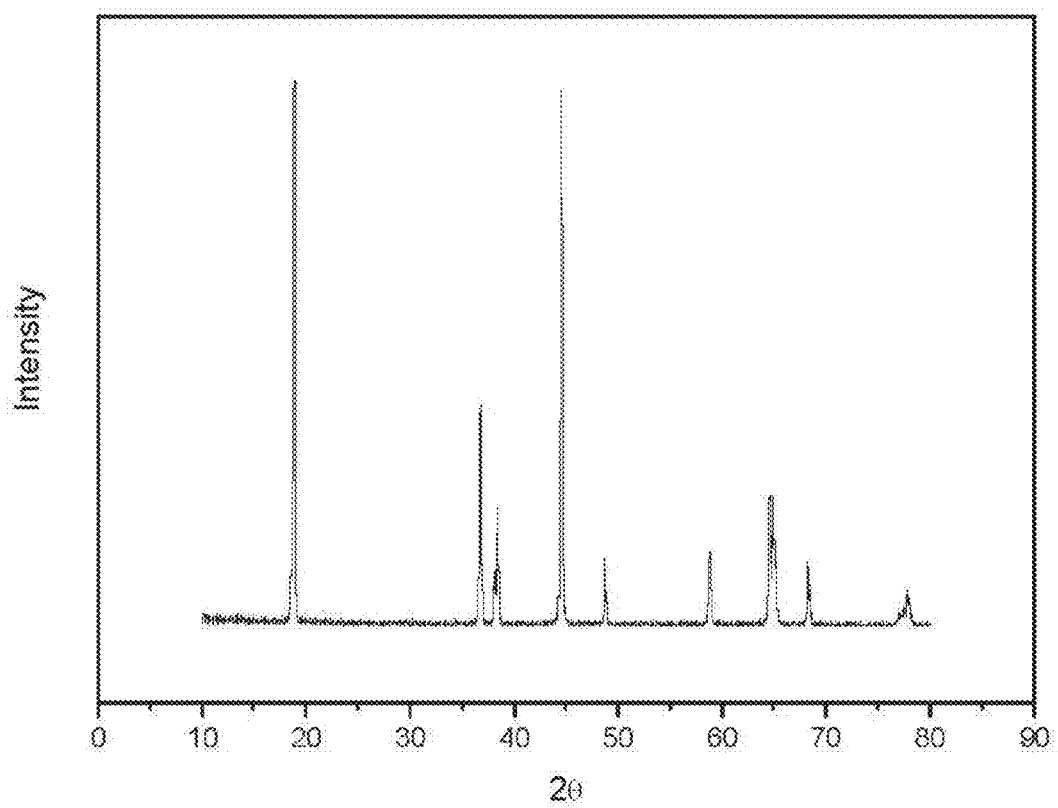

Example 9 Preparation of Boron-Doped Lithium Nickel Cobalt Oxide $LiNi_{0.79}Co_{0.2}B_{0.01}O_2$ To a 100 ml plastic beaker with a magnetic stirring bar, is added 3.8567 g (0.01326 mol) nickel nitrate hexahydrate, 0.9771 g (0.003357 mol) cobalt nitrate hexahydrate, 0.01038 g (0.0001679 mol) boric acid, 1.7983 g (0.01763 mol, 1.05× excess) lithium acetate dihydrate and 3.3575 g DI-water. The mixture is stirred overnight to afford a clear solution. To this solution, under vigorous stirring, is added 20 g of 10.98% wt hexadecyltrimethyl ammonium hydroxide. The solution turns into a green gel. The as-prepared gel is immediately moved into a furnace and is heated by the following step-wise temperature ramping procedure:
150° C./0.5 hour, 180° C./5 hours, 480° C./5 hours, 900° C./10 hours. A black solid is formed with quantitative yield. The XRD spectrum is shown in FIG. 12.

Figure 13:
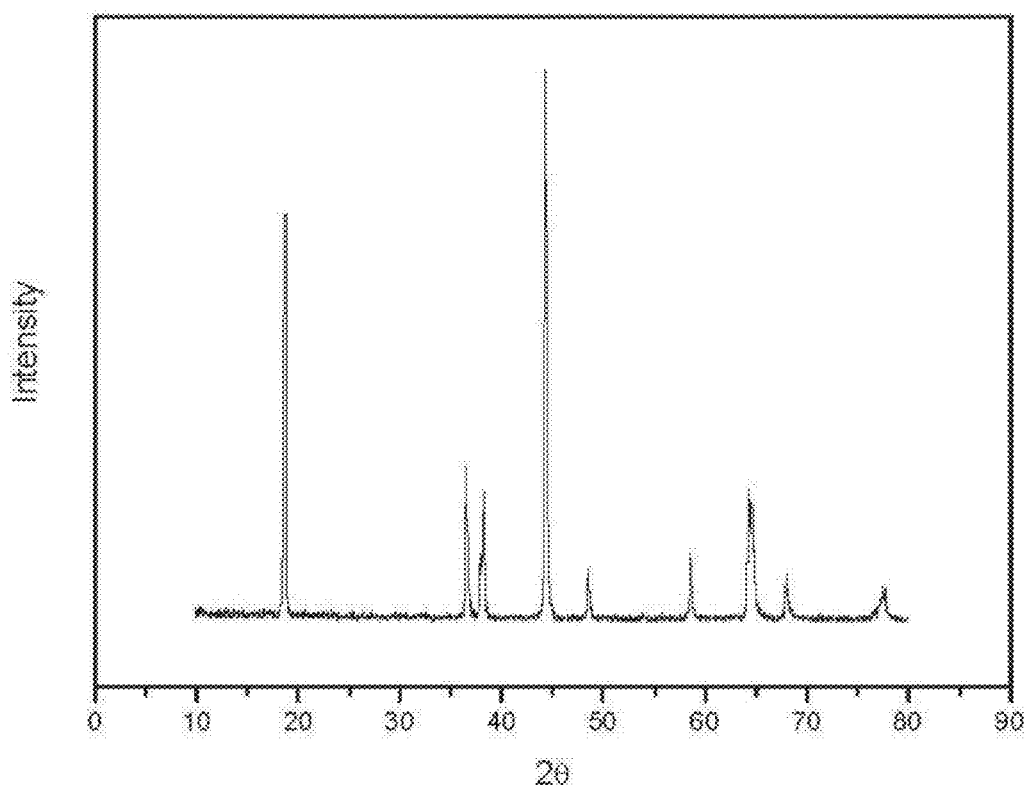

Example 10 Preparation of Tin-Doped Lithium Nickel Cobalt Oxide $LiNi_{0.79}Co_{0.2}Sn_{0.01}O_2$ To a 100 ml plastic beaker with a magnetic stirring bar, is added 3.8419 g (0.01321 mol) nickel nitrate hexahydrate, 0.9733 g (0.003344 mol) cobalt nitrate hexahydrate, 0.03773 g (0.0001672 mol) tin chloride dihydrate, 1.7914 g (0.01756 mol, 1.05× excess) lithium acetate dihydrate and 5.0257 g DI-water. The mixture is stirred overnight to afford a clear solution. To this solution, under vigorous stirring, is added 20 g of 10.98% wt hexadecyltrimethyl ammonium hydroxide. The solution turns into a green gel. The as-prepared gel is immediately moved into a furnace and is heated by the following step-wise temperature ramping procedure:
150° C./0.5 hour, 180° C./5 hours, 480° C./5 hours, 900° C./10 hours. A black solid is formed with quantitative yield. The XRD spectrum is shown in FIG. 13.

Figure 14:
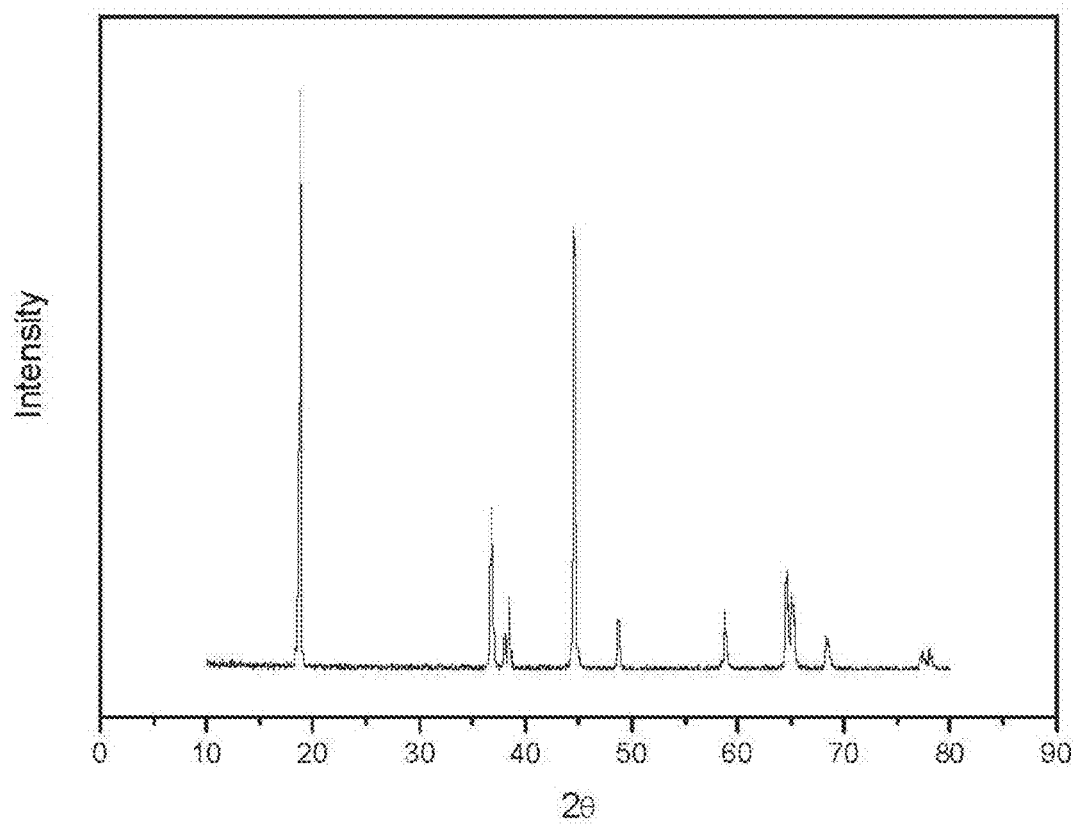
Figure 18:
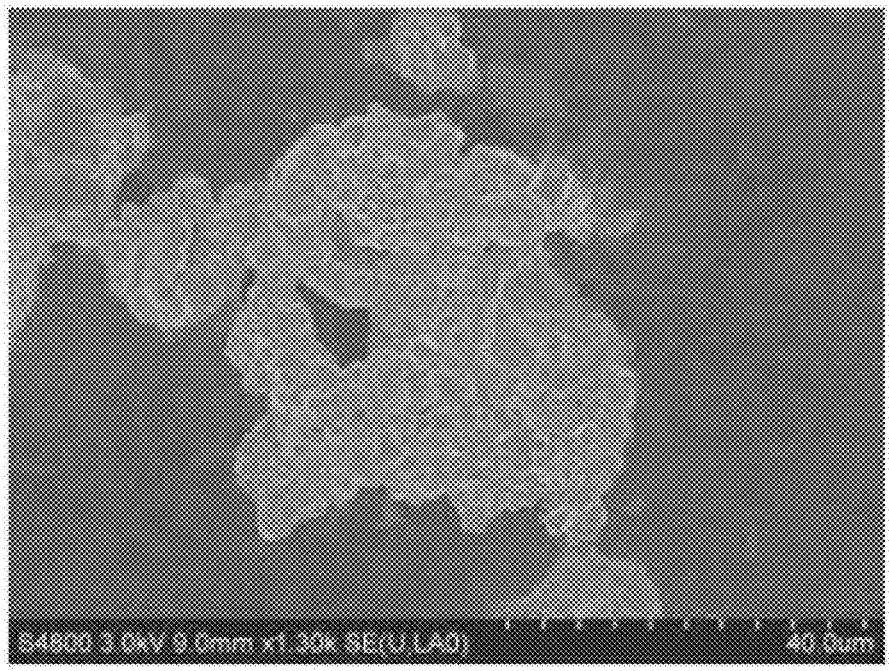
Figure 18:
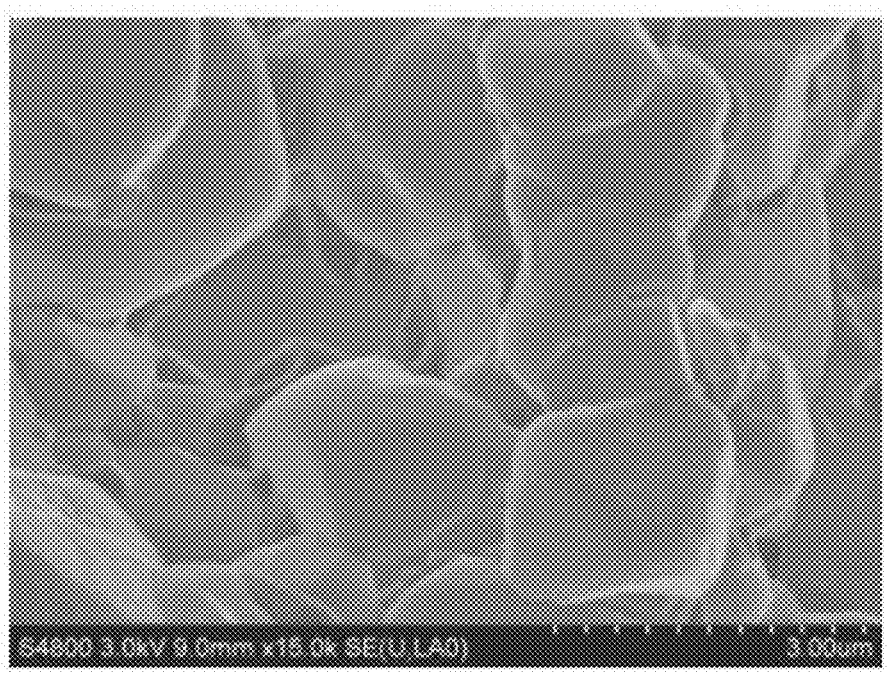

Example 11 Preparation of Aluminum-Doped Lithium Nickel Cobalt Oxide $LiNi_{0.72}Co_{0.2}Al_{0.08}O_2$ To a 100 ml plastic beaker with a magnetic stirring bar, is added 3.4636 g (0.01191 mol) nickel nitrate hexahydrate, 0.9628 g (0.003308 mol) cobalt nitrate hexahydrate, 0.4964 g (0.001323 mol) aluminum nitrate nonahydrate, 1.7720 g (0.01737 mol, 1.05 time excess) lithium acetate dehydrate, 1.97 g of 69.5% wt nitric acid and 7.9552 g DI-water. The mixture is stirred overnight to afford a clear solution. To this solution, under vigorous stirring, is added 20 g of 10.98% wt hexadecyltrimethyl ammonium hydroxide. The solution turns into a green gel. The as-prepared gel is immediately moved into a furnace and is heated by the following stepwise temperature ramping procedure:
150° C./0.5 hour, 180° C./5 hours, 480° C./5 hours, 900° C./10 hours. A black solid is formed with quantitative yield. The XRD spectrum is shown in FIG. 14. A scanning electron microscope (SEM) photograph of the $LiNi_{0.72}Co_{0.2}Al_{0.08}O_2$ ceramic material obtained in accordance with this embodiment of the present invention is shown in FIG. 18.

Figure 15:
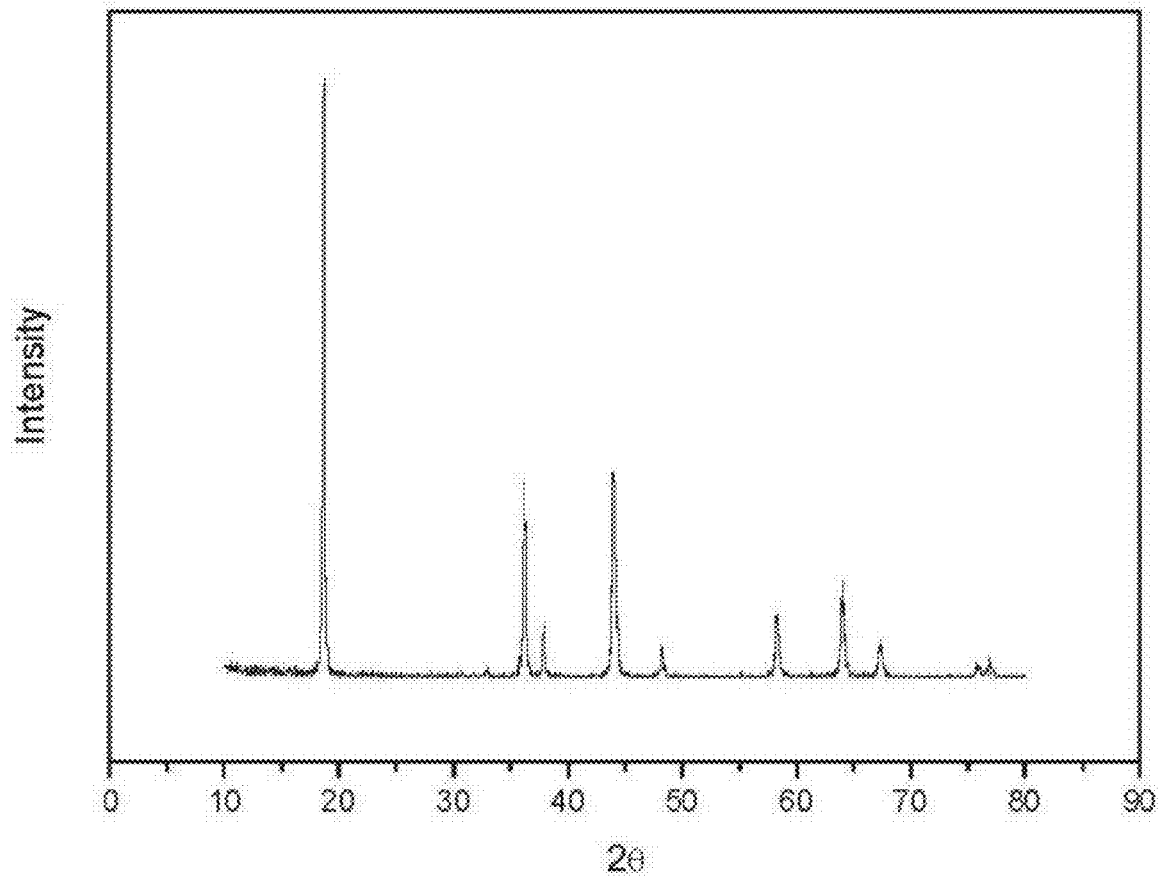
FIG. 15 is a X-ray diffraction spectrum of commercially available lithium manganese oxide, a ceramic material of the prior art.

For comparative purposes, FIG. 15 is a X-ray diffraction spectrum of a commercially available lithium manganese oxide, a ceramic material of the prior art.

Figure 19:
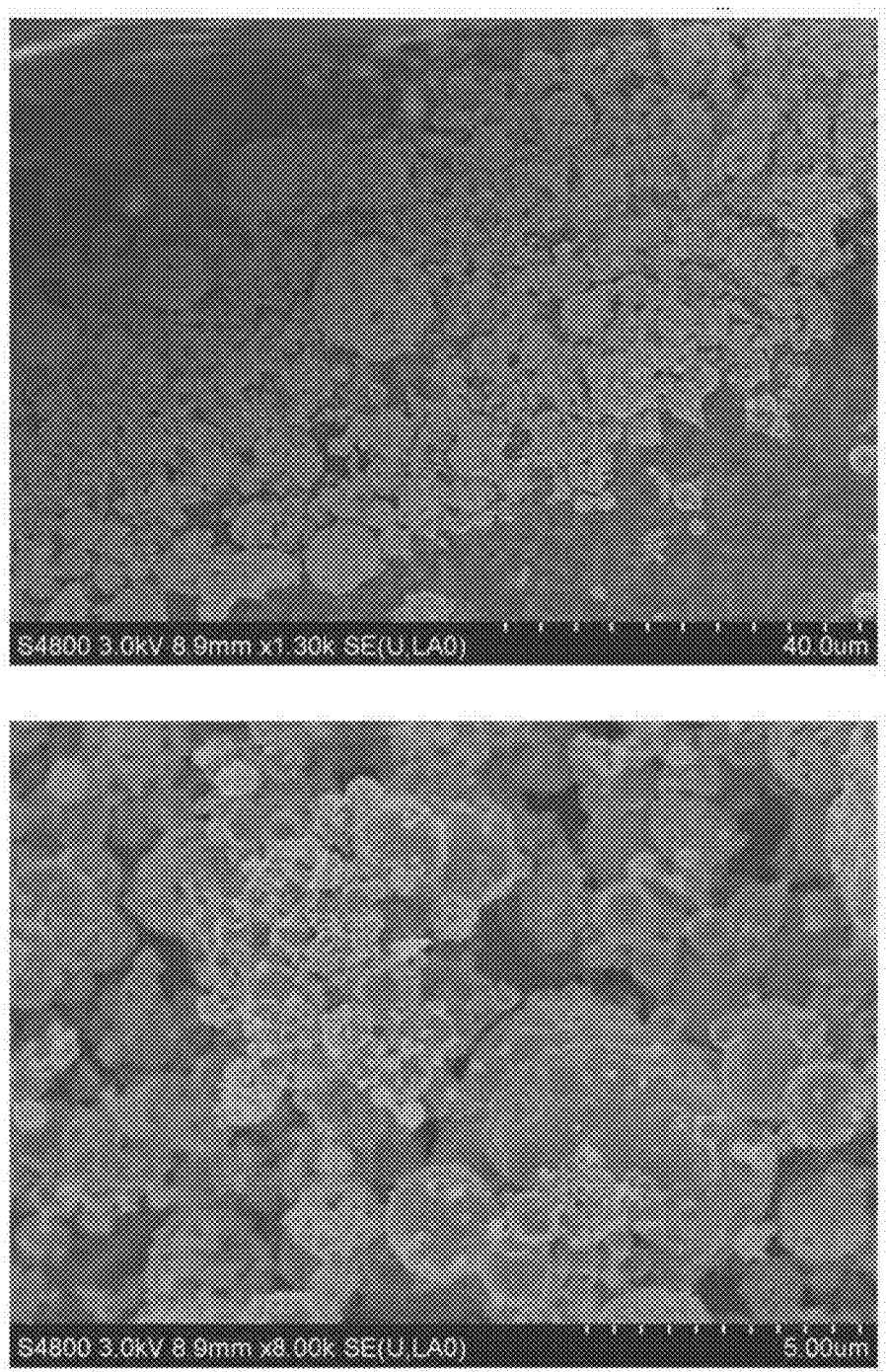
FIG. 19 is a SEM photograph of commercially available lithium manganese oxide, a ceramic material of the prior art.

For comparative purposes, FIG. 19 is a SEM photograph of a commercially available lithium manganese oxide, a ceramic material of the prior art.

While the principles of the invention have been explained in relation to certain particular embodiments, and are provided for purposes of illustration, it is to be understood that various modifications thereof will become apparent to those skilled in the art upon reading the specification. Therefore, it is to be understood that the invention disclosed herein is intended to cover such modifications as fall within the scope of the appended claims. The scope of the invention is limited only by the scope of the claims.

The invention claimed is:

1. A process for producing a ceramic material comprising:
providing an aqueous solution comprising:
a salt or oxide of at least one transition metal ion and one or more further transition metal ion and/or one or more additional ion, wherein the salt comprises a nitrate salt, or nitric acid is added to the aqueous solution;
adding to the aqueous solution a quaternary ammonium or phosphonium hydroxide comprising at least one alkyl group containing about 8 or more carbon atoms to form a combined aqueous solution, wherein the quaternary ammonium or phosphonium hydroxide is added at two times a molar concentration of nitrate ions from the salt or the added nitric acid;
mixing the combined aqueous solution to form a gel;
transferring the formed gel to a furnace; and
heating the formed gel to a temperature sufficient for a time sufficient to calcine the gel to form a solid ceramic material.

2. The process according to claim 1 wherein the formed gel is transferred directly to the furnace without an intervening step of water or solvent removal.

3. The process according to claim 1 wherein the aqueous solution further comprises a lithium ion.

4. The process according to claim 1 wherein the at least one transition metal ion comprises one or more ion of Group 3-12 of the IUPAC periodic table.

5. The process according to claim 1 wherein the aqueous solution further comprises at least one additional salt or oxide comprising one or more of B, Al, Sn, Zn, Mg, Ga, Zr, Si, Ge and Ti, provided that the at least one additional salt or oxide is different from the at least one transition metal salt or oxide.

6. The process according to claim 5 wherein the at least one additional salt or oxide is present in the ceramic material in a dopant quantity.

7. The process according to claim 1 wherein the at least one alkyl group contains from 8 to 40 carbon atoms.

8. The process according to claim 7 wherein the quaternary ammonium hydroxide further comprises three lower alkyl groups each having from 1 to less than 8 carbon atoms.

9. The process according to claim 7 wherein the quaternary ammonium hydroxide comprises two alkyl groups each containing from 8 to 40 carbon atoms.

10. The process according to claim 9 wherein the quaternary ammonium hydroxide further comprises two lower alkyl groups each having from 1 to less than 8 carbon atoms.

11. The process according to claim 1 wherein the at least one alkyl group containing 8 or more carbon atoms is unbranched.

12. The process according to claim 1 wherein the heating is conducted with stepwise increases to a final temperature in the range from about 750° C. to about 1000° C.

13. The process according to claim 12 wherein the heating is conducted in four steps, each step at a temperature greater than the previous step.

14. The process according to claim 12 wherein the heating is carried out for a total time of about 20 hours or more.

15. The process according to claim 4 wherein the aqueous solution further comprises a lithium ion.

16. The process according to claim 5 wherein the aqueous solution further comprises a lithium ion.

17. The process according to claim 6 wherein the aqueous solution further comprises a lithium ion.

* * * * *